United States Patent
Yao et al.

(10) Patent No.: US 11,569,550 B2
(45) Date of Patent: Jan. 31, 2023

(54) ELECTRODE WITH INTEGRATED CERAMIC SEPARATOR

(71) Applicant: EnPower, Inc., Phoenix, AZ (US)

(72) Inventors: Adrian Yao, Phoenix, AZ (US); Jonathan Hwang, Phoenix, AZ (US)

(73) Assignee: EnPower, Inc., Indianapolis, IN (US)

( * ) Notice: Subject to any disclaimer, the term of this patent is extended or adjusted under 35 U.S.C. 154(b) by 0 days.

(21) Appl. No.: 16/526,908

(22) Filed: Jul. 30, 2019

(65) Prior Publication Data

US 2020/0321585 A1    Oct. 8, 2020

Related U.S. Application Data

(60) Provisional application No. 62/830,301, filed on Apr. 5, 2019.

(51) Int. Cl.
| | |
|---|---|
| *H01M 50/46* | (2021.01) |
| *H01M 4/04* | (2006.01) |
| *H01M 50/403* | (2021.01) |
| *H01M 50/431* | (2021.01) |

(52) U.S. Cl.
CPC ......... *H01M 50/46* (2021.01); *H01M 4/0404* (2013.01); *H01M 50/403* (2021.01); *H01M 50/431* (2021.01)

(58) Field of Classification Search
CPC .. H01M 2/1673; H01M 2/164; H01M 2/1646; H01M 2/145; H01M 4/0404; H01M 50/46; H01M 50/403; H01M 50/431
See application file for complete search history.

(56) References Cited

U.S. PATENT DOCUMENTS

| | | |
|---|---|---|
| 5,873,523 A | 2/1999 | Gomez et al. |
| 6,287,720 B1 | 9/2001 | Yamashita et al. |
| 7,138,208 B2 | 11/2006 | Tanjo et al. |
| 7,348,101 B2 | 3/2008 | Gozdz et al. |
| 7,579,112 B2 | 8/2009 | Chiang et al. |
| 7,682,740 B2 | 3/2010 | Yong et al. |
| 7,745,048 B2 | 6/2010 | Hwang et al. |

(Continued)

FOREIGN PATENT DOCUMENTS

| | | |
|---|---|---|
| CN | 105304848 A | 2/2016 |
| CN | 107204416 A | 9/2017 |

(Continued)

OTHER PUBLICATIONS

U.S. Patent and Trademark Office, Office action, dated Dec. 22, 2017, In U.S. Appl. No. 15/663,524.

(Continued)

*Primary Examiner* — Cynthia H Kelly
*Assistant Examiner* — Kirsten B Tysl
(74) *Attorney, Agent, or Firm* — Kolitch Romano Dascenzo Gates LLC

(57) ABSTRACT

An electrode including an integrated separator for use in an electrochemical device may include one or more active material layers, and a separator layer comprising inorganic particles. An interlocking region may couple the separator layer to an adjacent active material layer. In some examples, the interlocking region may include interlocking fingers formed by an interpenetration of active material particles of the active material layers with ceramic particles of the separator.

14 Claims, 12 Drawing Sheets

(56) References Cited

U.S. PATENT DOCUMENTS

| | | |
|---|---|---|
| 7,781,098 B2 | 8/2010 | Chiang et al. |
| 8,062,789 B2 | 11/2011 | Kim et al. |
| 8,323,815 B2 | 12/2012 | Beard |
| 8,361,663 B2 | 1/2013 | Kang et al. |
| 8,409,511 B2 | 4/2013 | Thomas et al. |
| 8,591,604 B2 | 11/2013 | Berkowitz et al. |
| 8,669,008 B2 | 3/2014 | Cho et al. |
| 8,778,539 B2 | 7/2014 | Ohsawa et al. |
| 8,951,669 B2 | 2/2015 | Lee et al. |
| 9,178,209 B2 | 11/2015 | Kim et al. |
| 9,209,482 B2 | 12/2015 | Chu et al. |
| 9,263,730 B2 | 2/2016 | Suzuki |
| 9,543,568 B2 | 1/2017 | Sung et al. |
| 9,564,639 B2 | 2/2017 | Huang |
| 9,570,736 B2 | 2/2017 | Galande et al. |
| 9,583,756 B2 | 2/2017 | Ahn et al. |
| 10,038,193 B1 | 7/2018 | Schroder et al. |
| 2003/0099884 A1 | 5/2003 | Chiang et al. |
| 2005/0026037 A1* | 2/2005 | Riley, Jr. .............. H01M 4/64 429/210 |
| 2005/0236732 A1 | 10/2005 | Brosch et al. |
| 2008/0044733 A1 | 2/2008 | Ohata et al. |
| 2008/0057401 A1 | 3/2008 | Mori et al. |
| 2010/0297213 A1 | 11/2010 | Dupont et al. |
| 2011/0123866 A1 | 5/2011 | Pan et al. |
| 2011/0168550 A1 | 7/2011 | Wang et al. |
| 2011/0217585 A1 | 9/2011 | Wang et al. |
| 2012/0141877 A1 | 6/2012 | Choi et al. |
| 2012/0219841 A1 | 8/2012 | Bolandi et al. |
| 2012/0328942 A1 | 12/2012 | Thomas-Alyea et al. |
| 2014/0059820 A1 | 3/2014 | Wright et al. |
| 2014/0154401 A1 | 6/2014 | Salot et al. |
| 2014/0178769 A1 | 6/2014 | Pirk et al. |
| 2014/0287316 A1 | 9/2014 | Ahn et al. |
| 2014/0377661 A1 | 12/2014 | Lee et al. |
| 2015/0027615 A1 | 1/2015 | Singh et al. |
| 2015/0270522 A1 | 9/2015 | Yamada et al. |
| 2015/0372271 A1 | 12/2015 | Orilall et al. |
| 2016/0013480 A1 | 1/2016 | Sikha et al. |
| 2016/0211513 A1 | 7/2016 | Hao et al. |
| 2016/0285101 A1 | 9/2016 | Yoshio et al. |
| 2016/0336617 A1 | 11/2016 | Yamazaki |
| 2016/0351941 A1 | 12/2016 | Kobayashi |
| 2017/0098823 A1 | 4/2017 | Yushin et al. |
| 2017/0125788 A1 | 5/2017 | Ahn et al. |
| 2019/0198837 A1 | 6/2019 | Yushin et al. |
| 2019/0260000 A1 | 8/2019 | Carlson et al. |
| 2019/0288318 A1 | 9/2019 | Edmundson et al. |
| 2021/0194007 A1 | 6/2021 | Danno |

FOREIGN PATENT DOCUMENTS

| | | |
|---|---|---|
| JP | 2008004438 A | 1/2008 |
| JP | 2008198596 A | 8/2008 |
| JP | 2014127275 A | 7/2014 |
| JP | 6354420 B2 | 7/2018 |
| KR | 20120002433 A | 1/2012 |
| KR | 20160112266 A | 9/2016 |
| KR | 20170007210 A | 1/2017 |
| WO | 2011/029058 A2 | 3/2011 |
| WO | 2019023394 A1 | 1/2019 |

OTHER PUBLICATIONS

U.S. Patent and Trademark Office, Notice of Allowance and Fee(s) Due, dated Jul. 12, 2018, in U.S. Appl. No. 15/961,032.

U.S. Receiving Office, International Search Report and Written Opinion of the International Searching Authority, dated. Oct. 11, 2018, in PCT/US2018/043777.

\* cited by examiner

ELECTRODE WITH INTEGRATED CERAMIC SEPARATOR

CROSS-REFERENCES

This application claims the benefit under 35 U.S.C. § 119(e) of the priority of U.S. Provisional Patent Application Ser. No. 62/830,301, filed Apr. 5, 2019, the entirety of which is hereby incorporated by reference for all purposes.

FIELD

This disclosure relates to electrochemical cells. More specifically, the disclosed embodiments relate to electrodes having separators.

INTRODUCTION

Environmentally friendly sources of energy have become increasingly critical, as fossil fuel-dependency becomes less desirable. Most non-fossil fuel energy sources, such as solar power, wind, and the like, require some sort of energy storage component to maximize usefulness. Accordingly, battery technology has become an important aspect of the future of energy production and distribution. Most pertinent to the present disclosure, the demand for secondary (i.e., rechargeable) batteries has increased. Various combinations of electrode materials and electrolytes are used in these types of batteries, such as lead acid, nickel cadmium (Ni-Cad), nickel metal hydride (NiMH), lithium ion (Li-ion), and lithium ion polymer (Li-ion polymer).

SUMMARY

The present disclosure provides systems, apparatuses, and methods relating to an electrode having an integrated ceramic separator.

In some embodiments, an electrochemical cell electrode having an integrated separator layer may include: an electrochemical cell electrode including a current collector substrate and an electrode material composite layered onto the current collector substrate; a separator layer including a plurality of inorganic particles, disposed such that the electrode material composite is between the separator layer and the current collector substrate; and an interlocking region adhering the separator layer to the electrode material composite, the interlocking region including a non-planar interpenetration of the separator layer and the electrode material composite in which first fingers of the electrode material composite interlock with second fingers of the separator layer.

In some embodiments, an electrochemical cell electrode having an integrated separator layer may include: an electrochemical cell electrode having a current collector substrate coupled to one or more active material layers each comprising a respective plurality of active material particles; and a separator layer in direct contact with an adjacent layer of the one or more active material layers, such that the one or more active material layers are between the separator layer and the current collector substrate, the integrated separator layer including a plurality of ceramic particles; wherein an interlocking region secures the separator layer to the adjacent active material layer, the interlocking region including a non-planar boundary between the separator layer and the adjacent active material layer, such that the adjacent active material layer and the separator layer are interpenetrated.

In some embodiments, a method of manufacturing an electrode for an electrochemical cell may include: causing a current collector substrate and an electrode material composite dispenser to move relative to each other; and coating at least a portion of the current collector substrate with an electrode material composite and a separator material to produce an electrochemical cell electrode, using the dispenser, wherein coating includes: dispensing one or more active material layers each comprising a slurry of active material composite onto the current collector substrate using one or more respective first orifices of the dispenser; and dispensing a separator layer onto the one or more active material layers while the active material composite is wet, using one or more second orifices of the dispenser, such that the one or more active material layers are between the separator layer and the current collector substrate, the separator layer including a plurality of ceramic particles; wherein an interpenetrating boundary is formed between the separator layer and an adjacent one of the one or more active material layers.

Features, functions, and advantages may be achieved independently in various embodiments of the present disclosure, or may be combined in yet other embodiments, further details of which can be seen with reference to the following description and drawings.

DETAILED DESCRIPTION

Figure 1:
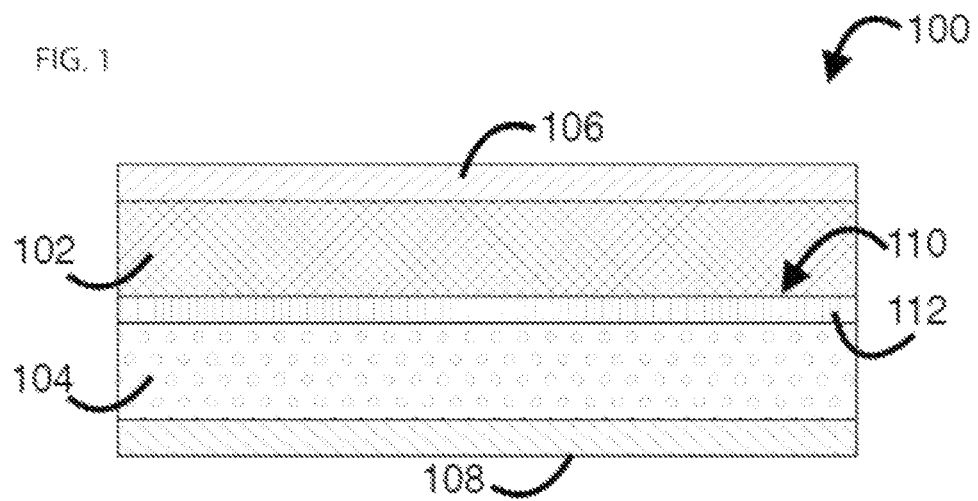
FIG. 1 is a schematic sectional view of an illustrative electrochemical cell.

Various aspects and examples of electrodes including an integrated ceramic separator, as well as related systems and methods, are described below and illustrated in the associated drawings. Unless otherwise specified, an electrode in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through F, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

Overview

In general, an electrode including an integrated separator in accordance with the present teachings may include an electrode layer having a plurality of active material particles adhered together by a first binder, and a separator layer including a plurality of ceramic particles adhered together by a second binder. The electrode further includes an interlocking region (AKA an interphase region) disposed between and adhering the electrode layer and the separator layer, wherein the interlocking region comprises a nonplanar boundary between the electrode layer and the separator layer.

The electrode layer may include a first active material layer including a first plurality of active material particles. In some embodiments, the electrode layer further includes a second active material layer including a second plurality of active material particles, defining a multilayer architecture. The first and second active material layers may have different porosities, different material chemistries, different active material particle sizes, and/or any alternative material property affecting electrode function. The electrode layer may have a thickness, measured as a distance perpendicular to the plane of a current collector to which the electrode is adhered and an opposing (AKA upper) surface of the electrode layer.

The separator layer may include a first plurality of inorganic particles. In some embodiments, the inorganic particles may be ceramics such as aluminum oxide (i.e., alumina (α-Al2O3)), corundum, calcined, tabular, synthetic boehmite, silicon oxides or silica, zirconia, and/or the like. The separator may have any suitable range of thicknesses (e.g., 1 μm-50 μm). The separator layer may be configured such that the separator isolates the electrode (e.g. anode or cathode) from an adjacent electrode included within an electrochemical cell, while maintaining permeability to a charge carrier such as a lithium-ion containing electrolyte.

The interlocking region may include a non-planar interpenetration of the electrode layer and the separator layer, in which first fingers or protrusions of the first layer interlock with second fingers or protrusions of the second layer. The interlocking layer or interface region created by the interpenetration of the electrode layer and the separator layer may reduce interfacial resistance and increase ion mobility through the electrode. The integrated separator may also prevent crust formation on active material surface of electrode, which may impede flow of ions.

In general, a method of manufacture for an electrode including an integrated separator may include extruding composite materials on a conductive substrate. An integrated separator layer may be extruded on the active material layer, either simultaneously or, in some examples, after drying. In some embodiments, simultaneous, near-simultaneous, or otherwise wet-on-wet extrusion of the integrated separator onto the active material layer may be utilized to create interpenetrating finger structures at a boundary between the separator and active material layers, as a result of turbulent flow at the boundary. This manufacturing process may eliminate the need to manufacture or obtain an extra component (e.g., polyolefin separator) and may reduce overall manufacturing costs.

Whereas known methods manufacture a separator for the cell independently from the electrodes, the separator described herein is manufactured as an integral part of at least one of the electrodes. Accordingly, the process of manufacturing an electrode with a separator layer is simplified. Moreover, the nonplanar interface between the separator and the active material of the electrode provides several benefits over known examples.

Examples, Components, and Alternatives

The following sections describe selected aspects of exemplary electrodes including integrated ceramic separators, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Electrochemical Cell

This section describes an electrochemical cell including an electrode of the present teachings. The electrochemical cell may be any bipolar electrochemical device, such as a battery (e.g. lithium-ion battery, secondary battery).

Referring now to FIG. 1, an electrochemical cell 100 is illustrated schematically in the form of a lithium-ion battery. Electrochemical cell 100 includes a positive and a negative electrode, namely a cathode 102 and an anode 104. The cathode and anode are sandwiched between a pair of current collectors 106, 108, which may comprise metal foils or other suitable substrates. Current collector 106 is electrically coupled to cathode 102, and current collector 108 is electrically coupled to anode 104. The current collectors enable the flow of electrons, and thereby electrical current, into and out of each electrode. An electrolyte 110 disposed throughout the electrodes enables the transport of ions between cathode 102 and anode 104. In the present example, electrolyte 110 includes a liquid solvent and a solute of dissolved ions. Electrolyte 110 facilitates an ionic connection between cathode 102 and anode 104.

Electrolyte 110 is assisted by a separator 112, which physically partitions the space between cathode 102 and anode 104. Separator 112 is liquid permeable, and enables the movement (flow) of ions within electrolyte 110 and between the two electrodes. As described further below, separator 112 may be integrated within one or both of cathode 102 and anode 104. In some embodiments, for example, separator 112 comprises a layer of ceramic particles applied to a top surface of an electrode (i.e., cathode 102 or anode 104), such that the ceramic particles of separator 112 are interpenetrated or intermixed with active material particles of cathode 102 or anode 104. In some embodiments, electrolyte 110 includes a polymer gel or solid ion conductor, augmenting or replacing (and performing the function of) separator 112.

Cathode 102 and anode 104 are composite structures, which comprise active material particles, binders, conductive additives, and pores (void space) into which electrolyte 110 may penetrate. An arrangement of the constituent parts of an electrode is referred to as a microstructure, or more specifically, an electrode microstructure.

In some examples, the binder is a polymer, e.g., polyvinylidene difluoride (PVdF), and the conductive additive typically includes a nanometer-sized carbon, e.g., carbon black or graphite. In some examples, the binder is a mixture of carboxyl-methyl cellulose (CMC) and styrene-butadiene rubber (SBR). In some examples, the conductive additive includes a ketjen black, a graphitic carbon, a low dimensional carbon (e.g., carbon nanotubes), and/or a carbon fiber.

In some examples, the chemistry of the active material particles differs between cathode 102 and anode 104. For example, anode 104 may include graphite (artificial or natural), hard carbon, titanate, titania, transition metals in general, elements in group 14 (e.g., carbon, silicon, tin, germanium, etc.), oxides, sulfides, transition metals, halides, and chalcogenides. On the other hand, cathode 102 may include transition metals (for example, nickel, cobalt, manganese, copper, zinc, vanadium, chromium, iron), and their oxides, phosphates, phosphites, and silicates. The cathode may also include alkalines and alkaline earth metals, aluminum, aluminum oxides and aluminum phosphates, as well as halides and chalcogenides. In an electrochemical device, active materials participate in an electrochemical reaction or process with a working ion to store or release energy. For example, in a lithium-ion battery, the working ions are lithium ions.

Electrochemical cell 100 may include packaging (not shown). For example, packaging (e.g., a prismatic can, stainless steel tube, polymer pouch, etc.) may be utilized to constrain and position cathode 102, anode 104, current collectors 106 and 108, electrolyte 110, and separator 112.

For electrochemical cell 100 to properly function as a secondary battery, active material particles in both cathode 102 and anode 104 must be capable of storing and releasing lithium ions through the respective processes known as lithiating and delithiating. Some active materials (e.g., layered oxide materials or graphitic carbon) fulfill this function by intercalating lithium ions between crystal layers. Other active materials may have alternative lithiating and delithiating mechanisms (e.g., alloying, conversion).

When electrochemical cell 100 is being charged, anode 104 accepts lithium ions while cathode 102 donates lithium ions. When a cell is being discharged, anode 104 donates lithium ions while cathode 102 accepts lithium ions. Each composite electrode (i.e., cathode 102 and anode 104) has a rate at which it donates or accepts lithium ions that depends upon properties extrinsic to the electrode (e.g., the current passed through each electrode, the conductivity of the electrolyte 110) as well as properties intrinsic to the electrode (e.g., the solid state diffusion constant of the active material particles in the electrode; the electrode microstructure or tortuosity; the charge transfer rate at which lithium ions move from being solvated in the electrolyte to being intercalated in the active material particles of the electrode; etc).

During either mode of operation (charging or discharging) anode 104 or cathode 102 may donate or accept lithium ions at a limiting rate, where rate is defined as lithium ions per unit time, per unit current. For example, during charging, anode 104 may accept lithium at a first rate, and cathode 102 may donate lithium at a second rate. When the second rate is lesser than the first rate, the second rate of the cathode would be a limiting rate. In some examples, the differences in rates may be so dramatic as to limit the overall performance of the lithium-ion battery (e.g., cell 100). Reasons for the differences in rates may depend on an energy required to lithiate or delithiate a quantity of lithium-ions per mass of active material particles; a solid state diffusion coefficient of lithium ions in an active material particle; and/or a particle size distribution of active material within a composite electrode. In some examples, additional or alternative factors may contribute to the electrode microstructure and affect these rates.

B. Illustrative Electrode with Integrated Separator

Operation of an energy storage device under demanding conditions at the limits of an electrode's capabilities requires accommodating stresses induced by volume expansion (swelling) and contraction during the charging and discharging of battery electrodes. This may lead to structural and functional challenges, as an electrochemical cell including the electrode may have one or more layers, each swelling or contracting at different rates during battery charging and discharging. More specifically, active material layers of electrodes may expand and contract during battery use, while inert separator particles may remain constant in size. Polyolefin separators, commonly used in lithium-ion batteries, may shrink while an adjacent electrode expands, increasing the risk that a battery including the electrode will short during use.

Ensuring continued structural integrity of an electrode-separator interface is necessary to prevent shorting between cathodes and anodes included in the battery, introducing several design considerations. A mechanical integrity or coherence of the electrochemical cell must be maintained so that an electrode and an adjacent separator remain mechanically stable and adhered to each other. Additionally, an interface between the active material layers and the separator should not block or inhibit a flow of ions through the electrochemical cell. In the case of an anode, the interface between the layers should not create regions of increased densification. Such increased densification can result in solid electrolyte interphase (SEI) buildup at the interface between the layers that subsequently blocks pores and induces lithium plating. These issues present challenges which must be addressed in the production of an electrochemical cell with a separator.

Figure 2:
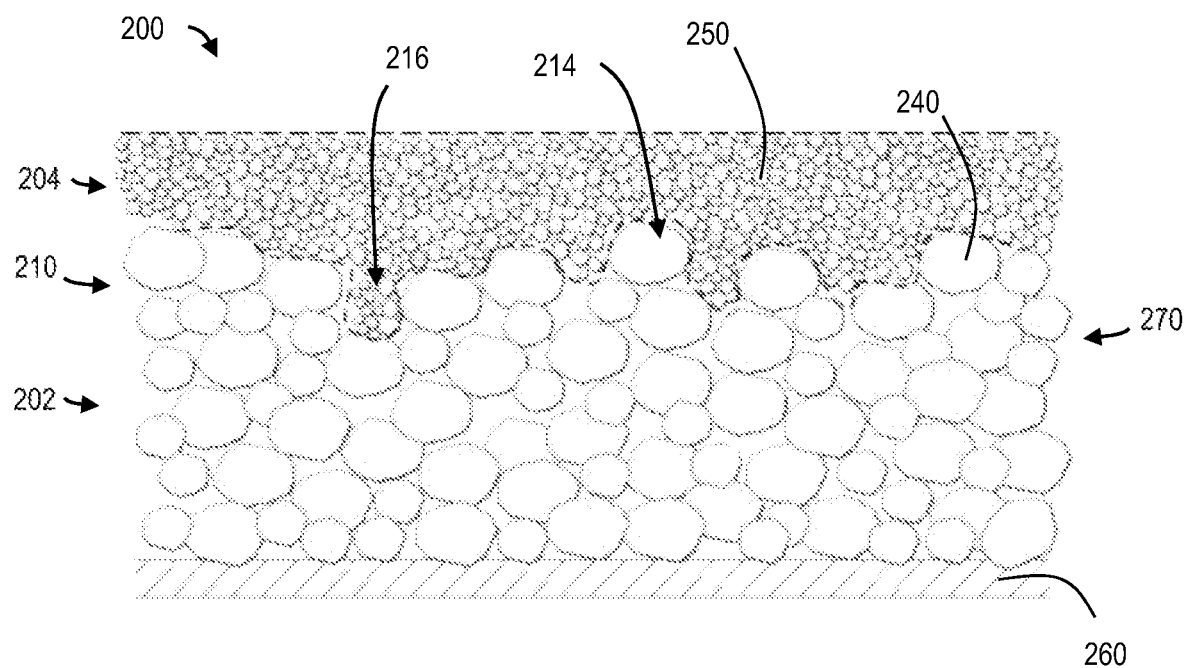
FIG. 2 is a sectional view of an illustrative electrode including an integrated ceramic separator layer.

With reference to FIG. 2, a single layer electrode 200 having an integrated ceramic separator is shown. Electrode 200 is an example of an anode or cathode suitable for inclusion in an electrochemical cell, similar to cathode 102 or anode 104, described above. Electrode 200 includes a current collector substrate 260 and an electrode material composite 270 layered onto the current collector substrate. Electrode material composite 270 includes an active material layer 202 and an integrated separator layer 204, with an interlocking region 210 disposed between active material layer 202 and integrated separator layer 204. Interlocking region 210 comprises a non-planar boundary between active material layer 202 and integrated separator layer 204, configured to decrease interfacial resistance between the layers and reduce lithium plating on the electrode layer.

Active material layer 202 is disposed on and directly in contact with current collector substrate 260. Active material layer 202 includes a plurality of first active material particles 240 adhered together by a first binder. Active material layer 202 may further include a conductive additive mixed with the active material particles. In some examples, the binder is a polymer, e.g., polyvinylidene difluoride (PVdF), and the conductive additive typically includes a nanometer-sized carbon, e.g., carbon black or graphite. In some examples, the binder is a mixture of carboxyl-methyl cellulose (CMC) and styrene-butadiene rubber (SBR). In some examples, the conductive additive includes a ketjen black, a graphitic carbon, a low dimensional carbon (e.g., carbon nanotubes), and/or a carbon fiber.

In some examples, electrode 200 is an anode suitable for inclusion within an electrochemical cell. In the case of such an anode, active material particles 240 may comprise graphite (artificial or natural), hard carbon, titanate, titania, transition metals in general, elements in group 14 (e.g., carbon, silicon, tin, germanium, etc.), oxides, sulfides, transition metals, halides, and chalcogenides.

In some examples, electrode 200 is a cathode suitable for inclusion within an electrochemical cell. In the case of such a cathode, active material particles 240 may comprise transition metals (for example, nickel, cobalt, manganese, copper, zinc, vanadium, chromium, iron), and their oxides, phosphates, phosphites, and silicates. The cathode active material particles may also include alkalines and alkaline earth metals, aluminum, aluminum oxides and aluminum phosphates, as well as halides and chalcogenides.

As depicted in FIG. 2, integrated separator layer 204 may be layered onto active material layer 202, and may include a plurality of ceramic particles 250 adhered together by a second binder. Although ceramic particles 250 are referred to as ceramics, particles 250 may comprise any suitable inorganic material or materials, including ceramics such as aluminum oxide (i.e., alumina ($\alpha$-$Al_2O_3$)), corundum, calcined, tabular, synthetic boehmite, silicon oxides or silica, zirconia, and/or the like. Ceramic particles 250 may be electrically non-conductive.

Ceramic particles 250 may have a greater hardness than active material particles 240. As a result, separator layer 204 may have a higher resistance to densification and lower compressibility than active material layer 202. In some examples, the second binder is a polymer, e.g., polyvinylidene difluoride (PVdF). Integrated separator layer 204 may have any thickness suitable for allowing ionic conduction while electrically insulating the electrode. In some examples, separator layer 204 may have a thickness between one μm and fifty μm.

Integrated separator layer 204 may comprise varying mass fractions of inorganic particles (e.g., ceramic particles) and varying mass fractions of binders and other additives. In some examples, the separator layer is between 50% and 99% inorganic material. In other examples, the separator layer is greater than 99% inorganic material and less than 1% binder. In the examples having greater than 99% inorganic material, the electrode may be manufactured in a similar fashion to electrodes with separator layers having lower percentages of inorganic material, optionally followed by ablation of excess binder during post-processing.

In other examples, the separator layer is less than 50% inorganic material and greater than 50% binder, by mass. In these cases, the binder may comprise a coblocked polymer such as a polyamide, polyethylene, polypropylene, polyolefin, and/or any combination of suitable polymers with a porous structure. The binder may comprise a first and second polypropylene layer and a polyethylene layer intermediate the polypropylene layers. This high-binder content configuration may function as a "shutdown" mechanism for the electrode. For example, the polyethylene layer may melt or collapse at high temperatures (e.g., in a fire), thus stopping ionic and electrode conduction and thereby improving device safety. On the other hand, the high-binder embodiments may decrease calendering advantages seen in separator layers with higher fractions of inorganic material.

In some examples, an additional polyolefin separator layer may be added on a top surface of the integrated separator layer.

Interlocking region 210 includes a non-planar boundary between active material layer 202 and separator layer 204. Active material layer 202 and separator layer 204 have respective, three-dimensional, interpenetrating fingers 214 and 216 that interlock the two layers together, forming a mechanically robust interface that is capable of withstanding stresses, such as those due to electrode expansion and contraction, and separator shrinking. Additionally, the non-planar surfaces defined by fingers 214 and fingers 216 represent an increased total surface area of the interface boundary, which may provide reduced interfacial resistance and may increase ion mobility through the electrode. Fingers 214 and 216 may be interchangeably referred to as fingers, protrusions, extensions, projections, and/or the like. Furthermore, the relationship between fingers 214 and 216 may be described as interlocking, interpenetrating, intermeshing, interdigitating, interconnecting, interlinking, and/or the like.

Fingers 214 and fingers 216 are a plurality of substantially discrete interpenetrations, wherein fingers 214 are generally made up of the electrode's active material particles 240 and fingers 216 are generally made up of ceramic separator particles 250. The fingers are three-dimensionally interdigitated, analogous to an irregular form of the stud-and-tube construction of Lego bricks. Accordingly, fingers 214 and 216 typically do not span the electrode in any direction, such that a cross section perpendicular to that of FIG. 2 will also show a non-planar, undulating boundary similar to the one shown in FIG. 2. Interlocking region 210 may alternatively be referred to as a non-planar interpenetration of active material layer 202 and separator layer 204, including fingers 214 interlocked with fingers 216.

Figure 3:
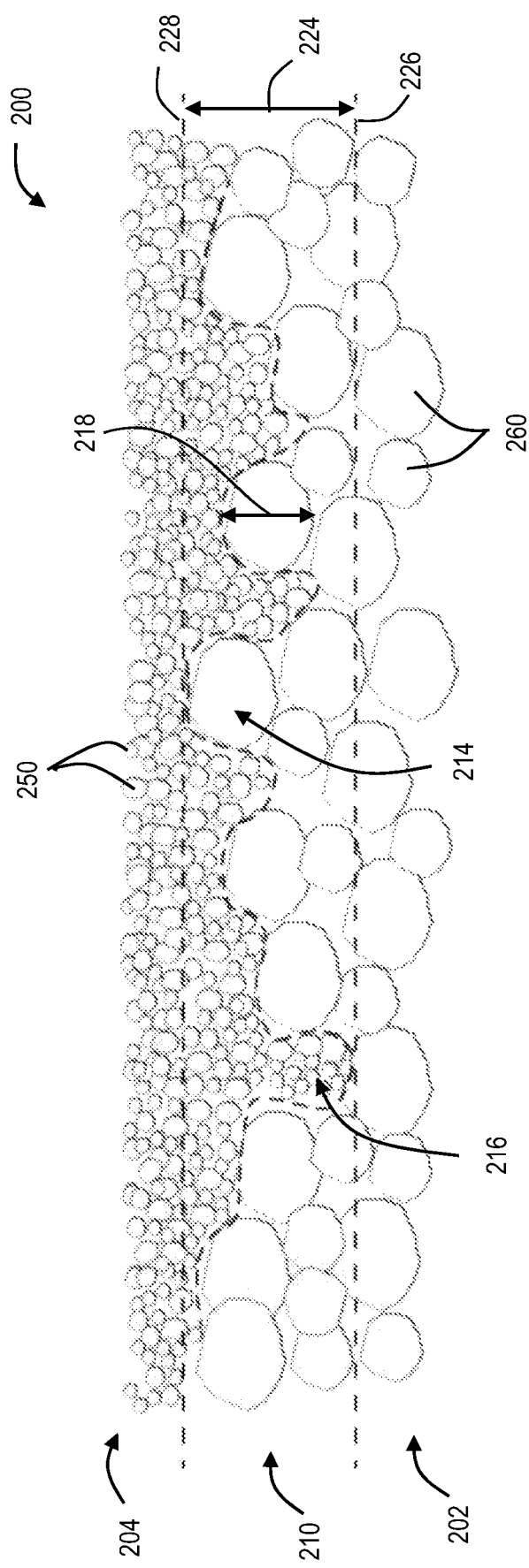
FIG. 3 is a sectional view of an interlocking region included within the illustrative electrode of FIG. 2.

As shown in FIG. 3, although fingers 214 and 216 may not be uniform in size or shape, the fingers may have an average or typical length 218. In some examples, length 218 of fingers 214 and 216 may fall in a range between two and five times the average particle size of the first active material layer or the separator layer, whichever is smaller. In some examples, length 218 of fingers 214, 216 may fall in a range between six and ten times the average particle size of the first active material layer or the separator layer, whichever is smaller. In some examples, length 218 of fingers 214 and 216 may fall in a range between eleven and fifty times the average particle size of the first active material layer or the separator layer, whichever is smaller. In some examples, length 218 of fingers 214 and 216 may be greater than fifty times the average particle size of the first active material layer or the separator layer, whichever is smaller.

In some examples, length 218 of fingers 214 and 216 may fall in a range of approximately five hundred to approximately one thousand nanometers. In some examples, length 218 of fingers 214 and 216 may fall in a range of approximately one to approximately five μm. In some examples, length 218 of fingers 214 and 216 may fall in a range between approximately six and approximately ten μm. In another example, length 218 of fingers 214 and 216 may fall in a range between approximately eleven and approximately fifty μm. In another example, length 218 of fingers 214 and 216 may be greater than approximately fifty μm.

In the present example, a total thickness 224 of interlocking region 210 is defined by the level of interpenetration between the two electrode material layers (first active material layer 202 and separator layer 204). A lower limit 226 may be defined by the lowest point reached by separator layer 204 (i.e. by fingers 216). An upper limit 228 may be defined by the highest point reached by first active material layer 202 (i.e. by fingers 214). Total thickness 224 of interlocking region 210 may be defined as the separation or distance between limits 226 and 228. In some examples, the total thickness of interlocking region 210 may fall within one or more of various relative ranges, such as between approximately 200% (2×) and approximately 500% (5×), approximately 500% (5×) and approximately 1000% (10×), approximately 1000% (10×) and approximately 5000% (50×), and/or greater than approximately 5000% (50×) of the average particle size of the first active material layer or the separator layer, whichever is smaller.

In some examples, total thickness 224 of interlocking region 210 may fall within one or more of various absolute ranges, such as between approximately 500 and one thousand nanometers, one and approximately ten μm, approximately ten and approximately fifty μm, and/or greater than approximately fifty μm.

In the present example, first active material particles 240 in first active material layer 202 have a distribution of volumes which have a greater average than an average volume of ceramic particles 250 in separator layer 204 i.e., a larger average size. In some examples, first active material particles 240 have a collective surface area that is less than the collective surface area of ceramic particles 250.

In the present example, first active material particles 240 and ceramic particles 250 are substantially spherical in particle morphology. In other examples, one or both of the plurality of particles in either the first active material layer or the separator layer may have particle morphologies that are: flake-like, platelet-like, irregular, potato-shaped, oblong, fractured, agglomerates of smaller particle types, and/or a combination of the above.

When particles of electrode portion 200 are lithiating or delithiating, electrode portion 200 remains coherent, and the first active material layer and the separator layer remain bound by interlocking region 210. In general, the interdigitation or interpenetration of fingers 214 and 216, as well as the increased surface area of the interphase boundary, function to adhere the two zones together.

In one example, electrode portion 200 is a portion of a cathode included in a lithium ion cell. In this example during charging of the lithium ion cell, first active material particles 240 delithiate. During this process, the active material particles may contract, causing active material layer 202 to contract. In contrast, during discharging of the cell, the active material particles lithiate and swell, causing active material layer 202 to swell.

In an alternate example, electrode portion 200 is a portion of an anode included in a lithium ion cell. In this example, during charging of the lithium ion cell, first active material particles 240 lithiate. During this process, the active material particles may swell, causing active material layer 202 to swell. In contrast, during discharging of the cell, first active material particles 240 delithiate and contract, causing contraction of active material layer 202.

In either of these examples, during swelling and contracting, electrode portion 200 may remain coherent, and active material layer 202 and separator layer 204 remain bound by interlocking region 210. This bonding of the active material layer and separator layer may decrease interfacial resistance between the layers and maintain mechanical integrity of an electrochemical cell including the electrode.

Interlocking region 210 may comprise a network of fluid passageways defined by active material particles, ceramic particles, binder, conductive additives, and/or additional layer components. These fluid passages are not hampered by calendering-induced changes in mechanical or morphological state of the particles due to the non-planar boundary included in the interlocking region. In contrast, a substantially planar boundary is often associated with the formation of a crust layer upon subsequent calendering. Such a crust layer is disadvantageous as it can significantly impede ion conduction through the interlocking region. Furthermore, such a crust layer also represents a localized compaction of active material particles that effectively result in reduced pore volumes within the electrode. This may be an issue of particular importance for anodes, as solid electrolyte interphase (SEI) film buildup on active material particles clogs pores included within the electrode at a quicker rate, leading to lithium plating, decreasing safety and cycle life of the electrode.

An anode with integrated ceramic separator according to the present disclosure may experience additional benefits over alternate electrode forms. As anodes may include active material particles with comparatively larger average particle size than other electrodes (e.g. cathodes), anodes may experience increased compressibility from simultaneous calendering with an integrated separator layer. As ceramic separator particles may have a hardness greater than a hardness of the anode active material particles and therefore a greater resistance to densification during a calendering process, the ceramic separator layer may transfer compressive loads to the anode layer disposed beneath the ceramic separator layer.

C. Illustrative Multi-Layered Electrode with Integrated Separator

Figure 4:
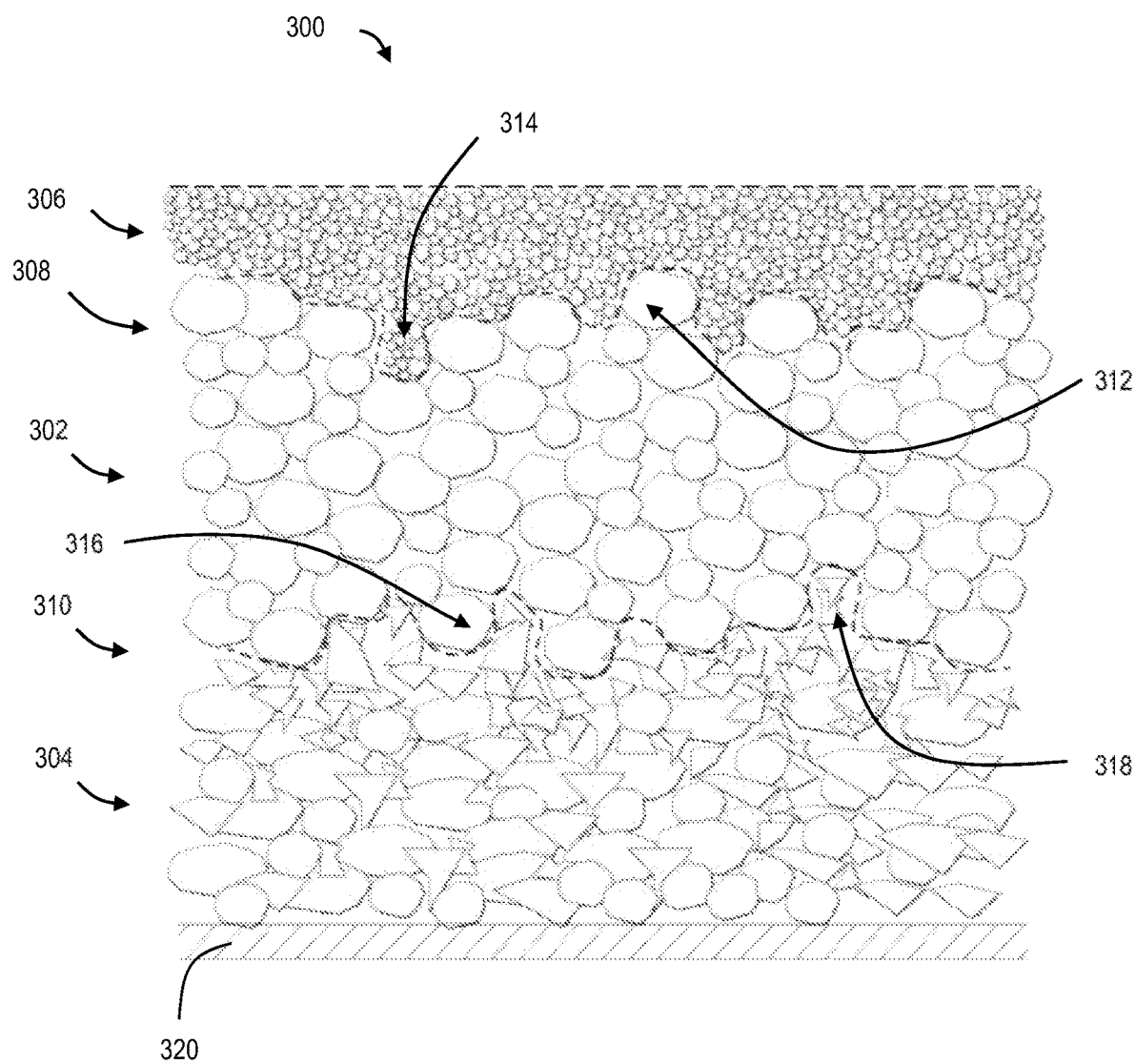
FIG. 4 is a sectional view of an illustrative integrated ceramic separator coating with a multilayered electrode.

FIG. 4 is an illustrative multi-layered electrode 300 including a first active material layer 302, a second active material layer 304, and a separator layer 306. Second active material layer 304 may be disposed adjacent to a current collector substrate 320. First active material layer 302 may be layered on top of second active material layer 304. Separator layer 306 may be layered on top of first active material layer 302. First active material layer 302 may include a plurality of first active material particles adhered together by a first binder. Second active material layer 304 may include a plurality of second active material particles adhered together by a second binder. The first and second active material particles may be substantially similar to active material particles 240, described above. Separator layer 306 may include a plurality of inorganic particles adhered together by a third binder. The inorganic particles may be substantially similar to ceramic particles 250, described above.

A first interlocking region 308 is formed between separator layer 306 and first active material layer 302. A second interlocking region 310 is formed between first active material layer 302 and second active layer 304.

First interlocking region 308 may include a non-planar boundary between first active material layer 302 and separator layer 306. First active material layer 302 may have a first plurality of fingers 312 extending toward separator layer 306. Separator layer 306 may have a second plurality of fingers 314. First interlocking region 308 may include an interpenetration of fingers 312 and fingers 314, which may bind the first active material layer and the separator layer together.

Second interlocking region 310 may include a non-planar boundary between first active material layer 302 and second active material layer 304. First active material layer 302 may have a third plurality of fingers 316 extending toward current collector substrate 320. Second active material layer 304 may have a fourth plurality of fingers 318. Second interlocking region 310 may include an interpenetration of fingers 316 and 318, which may bind the first and second active material layers together. The configuration of the fingers in first interlocking region 308 and second interlocking region 310 is substantially similar to the configuration of the fingers in interlocking region 210 of FIG. 2, described above.

Additional aspects and features of electrodes including integrated ceramic separators are presented below, without limitation, as a series of interrelated paragraphs.

A0. An electrochemical cell electrode having an integrated separator layer, the electrode comprising:
an electrochemical cell electrode including a current collector substrate and an electrode material composite layered onto the current collector substrate;
a separator layer including a plurality of inorganic particles, disposed such that the electrode material composite is between the separator layer and the current collector substrate; and
an interlocking region adhering the separator layer to the electrode material composite, the interlocking region including a non-planar interpenetration of the separator layer and the electrode material composite in which first fingers of the electrode material composite interlock with second fingers of the separator layer.

A1. The electrode of A0, wherein the electrode material composite comprises a first layer including a plurality of first active material particles, and a second layer including a plurality of second active material particles.

A2. The electrode of A0 or A1, wherein a mass fraction of the inorganic particles in the separator layer is greater than 50%.

A3. The electrode of A2, wherein the mass fraction of the inorganic particles in the separator layer is greater than 99%.

A4. The electrode of A0 or A1, wherein the separator layer further comprises a polymer mixed with the inorganic particles, such that a mass fraction of the inorganic particles in the separator layer is less than 50% and a mass fraction of the polymer is greater than 50%.

A5. The electrode of any one of paragraphs A0 through A4, further comprising a layer of polyolefin disposed on the separator layer, such that the separator layer is between the layer of polyolefin and the electrode material composite.

A6. The electrode of any one of paragraphs A0 through A5, wherein the plurality of inorganic particles comprise a ceramic material.

B0. An electrochemical cell electrode having an integrated separator layer, the electrode comprising:
an electrochemical cell electrode having a current collector substrate coupled to one or more active material layers each comprising a respective plurality of active material particles; and
a separator layer in direct contact with an adjacent layer of the one or more active material layers, such that the one or more active material layers are between the separator layer and the current collector substrate, the integrated separator layer including a plurality of ceramic particles;
wherein an interlocking region secures the separator layer to the adjacent active material layer, the interlocking region including a non-planar boundary between the separator layer and the adjacent active material layer, such that the adjacent active material layer and the separator layer are interpenetrated.

B1. The electrode of B0, wherein the non-planar boundary comprises a plurality of substantially discrete first fingers of the active material particles interlocked with a plurality of substantially discrete second fingers of the ceramic particles.

B2. The electrode of B0 or B1, comprising only a single active material layer extending from the current collector substrate to the separator layer.

B3. The electrode of any one of paragraphs B0 through B2, wherein a mass fraction of the ceramic particles in the separator layer is greater than 50%.

B4. The electrode of B3, wherein the mass fraction of the ceramic particles in the separator layer is greater than 99%.

B5. The electrode of any one of paragraphs B0 through B2, wherein the separator layer further comprises a polymer mixed with the ceramic particles, such that a mass fraction of the ceramic particles in the separator layer is less than 50% and a mass fraction of the polymer is greater than 50%.

B6. The electrode of any one of paragraphs B0 through B5, further comprising a layer of polyolefin disposed on the separator layer, such that the separator layer is between the layer of polyolefin and the one or more active material layers.

B7. The electrode of any one of paragraphs B0 through B6, wherein the plurality of ceramic particles consist of an aluminum oxide.

C0. An electrode comprising:

an electrochemical cell electrode including a current collector substrate and an electrode material composite layered onto the current collector substrate, wherein the electrode material composite comprises an active material layer layered onto the current collector substrate, the active material layer including a plurality of first active material particles adhered together by a first binder;

an integrated separator layer layered onto the active material layer, such that the active material layer is between the separator layer and the current collector substrate, the integrated separator layer including a plurality of ceramic particles adhered together by a second binder; and an interlocking region configured to secure the active material layer to the integrated separator layer, the interlocking region including a non-planar boundary between the active material layer and the integrated separator layer, such that the active material layer and the integrated separator layer are interpenetrated;

wherein the non-planar boundary comprises a plurality of substantially discrete first fingers of the first active material particles interlocked with a plurality of substantially discrete second fingers of the ceramic particles.

D0. An electrode comprising:

an electrochemical cell electrode including a current collector substrate and an electrode material composite layered onto the current collector substrate, wherein the electrode material composite comprises a first layer including a plurality of first active material particles;

a second layer including a plurality of ceramic separator particles, such that the first layer is between the second layer and the current collector substrate; and an interlocking region adhering the first layer to the second layer, the interlocking region including a non-planar interpenetration of the first and second layers in which first fingers of the first layer interlock with second fingers of the second layer.

D. Illustrative Electrode Manufacturing Method

The following describes steps of an illustrative method 400 for forming an electrode including multiple layers; see FIGS. 5-9.

Aspects of electrodes and manufacturing devices described herein may be utilized in the method steps described below. Where appropriate, reference may be made to components and systems that may be used in carrying out each step. These references are for illustration, and are not intended to limit the possible ways of carrying out any particular step of the method.

Figure 5:
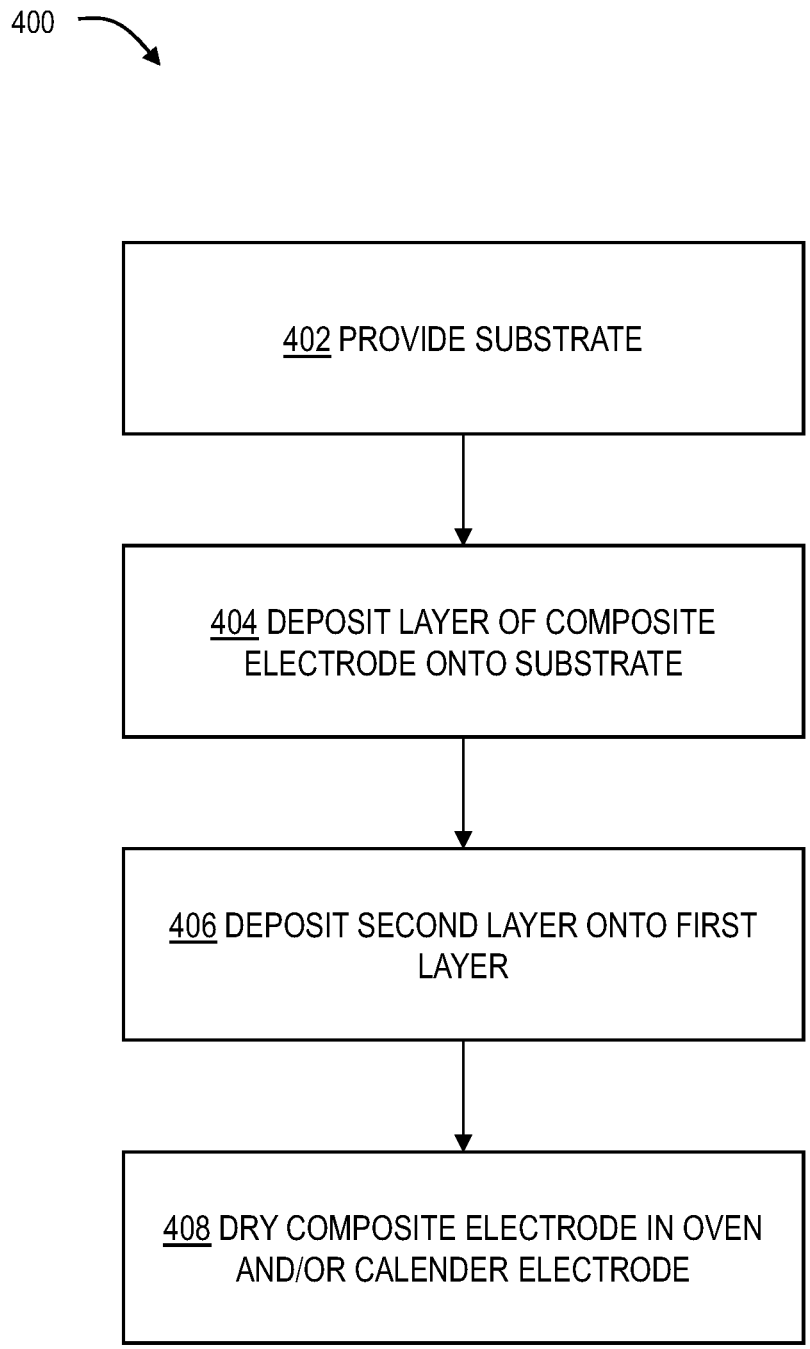
FIG. 5 is a flow chart depicting steps of an illustrative method for manufacturing electrodes in accordance with aspects of the present disclosure.

FIG. 5 is a flowchart illustrating steps performed in an illustrative method, and may not recite the complete process or all steps of the method. Although various steps of method 400 are described below and depicted in FIG. 5, the steps need not necessarily all be performed, and in some cases may be performed simultaneously, or in a different order than the order shown.

Step 402 of method 400 includes providing a substrate, wherein the substrate includes any suitable structure and material configured to function as a conductor in a secondary battery of the type described herein. In some examples, the substrate comprises a current collector. In some examples, the substrate comprises a metal foil. The term "providing" here may include receiving, obtaining, purchasing, manufacturing, generating, processing, preprocessing, and/or the like, such that the substrate is in a state and configuration for the following steps to be carried out.

Method 400 next includes a plurality of steps in which at least a portion of the substrate is coated with an electrode material composite. This may be done by causing a current collector substrate and an electrode material composite dispenser to move relative to each other, by causing the substrate to move past an electrode material composite dispenser (or vice versa) that coats the substrate as described below. The composition of material particles in each electrode material composite layer may be selected to achieve the benefits, characteristics, and results described herein. The electrode material composite may include one or more electrode layers, including a plurality of active material particles, and one or more separator layers, each including a plurality of inorganic material particles.

Figure 6:
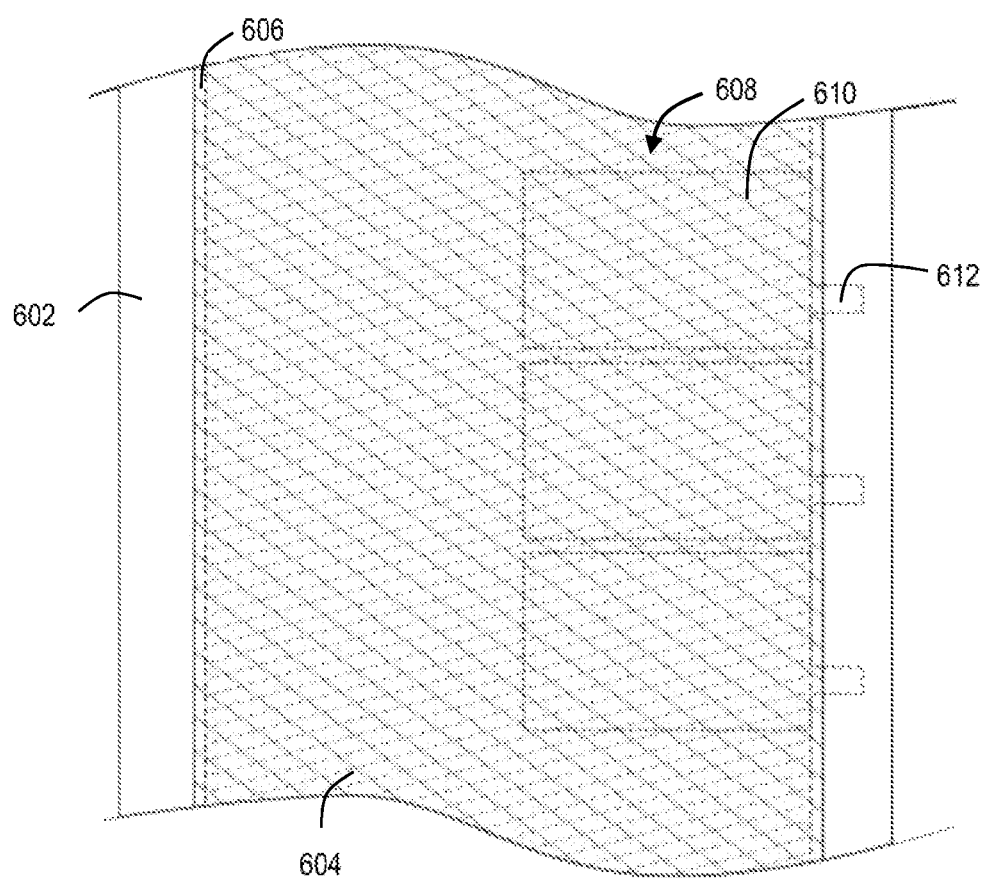
FIG. 6 depicts an example of an electrode material composite on a substrate web, prior to blanking.
Figure 7:
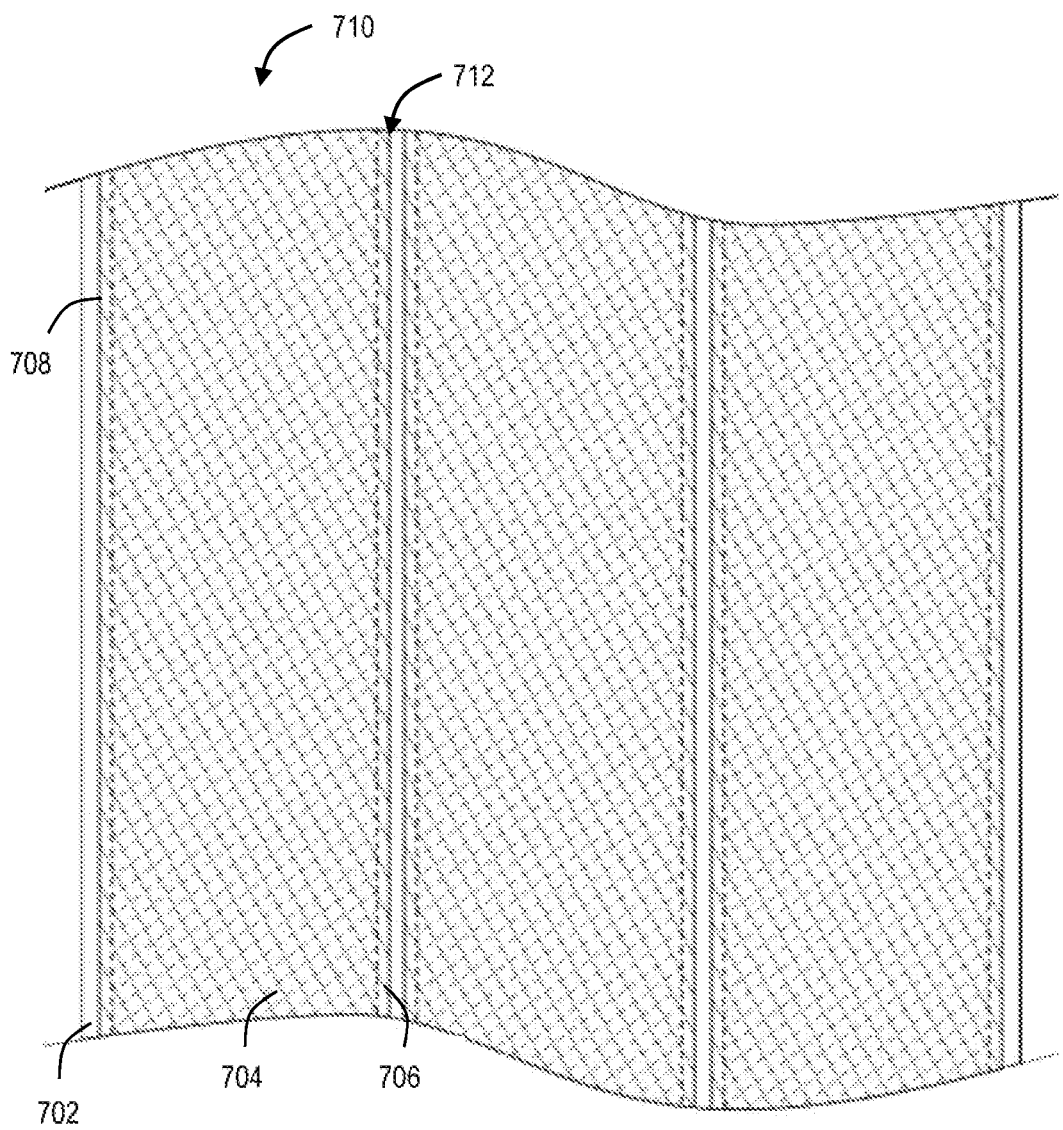
FIG. 7 depicts an example of an electrode material composite on a substrate web configured in lanes.
Figure 8:
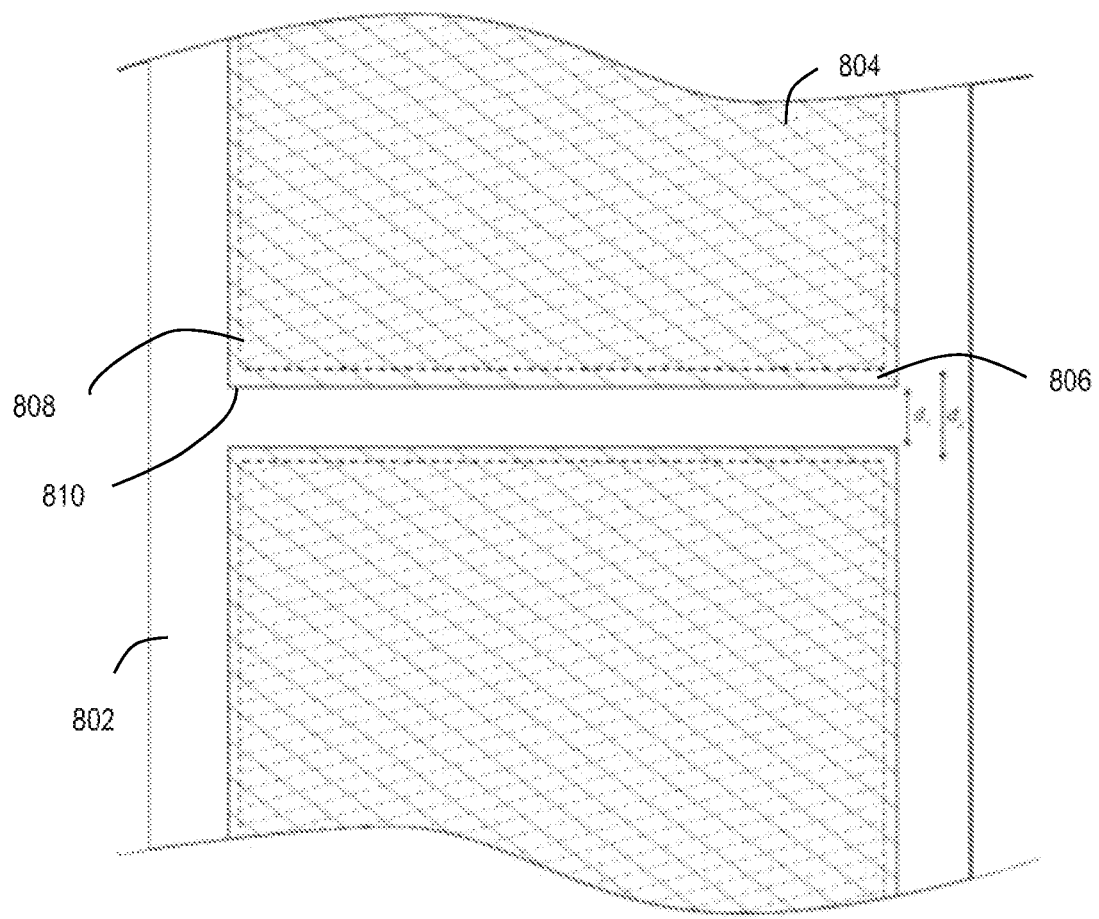
FIG. 8 depicts an example of an electrode material composite implemented with a skip coating manufacturing process.

FIGS. 6-8 depict electrode layers and a separator layer formed on a substrate in various illustrative configurations, depicting how a manufactured electrode may be arranged on a web as a function of relative motion between the current collector substrate and the electrode material composite dispenser.

FIG. 6 depicts a substrate web 602 having an electrode layer 604 applied directly to the substrate web and a separator layer 606 disposed on top of the electrode layer. The electrode layer may comprise one active material layer or two or more active material layers. The layers disposed on the substrate in this manner facilitate electrode blanking, in which the conductive substrate, electrode layer, and separator layer may be cut from the web in one piece. An electrode cut in this embodiment of the manufacturing method may have a shape 608, including an electrode body 610 and tab 612. This may allow for a simpler manufacturing process and further reduce cost of manufacturing electrodes.

FIG. 7 is an example of how a similar concept can be used to coat multiple lanes simultaneously. A multiple lane configuration may be used for blanking electrodes for use in pouch cells as well as for use in wound cells wherein a foil region is left unslit for tabbing. This configuration may be suitable for high power applications. In this embodiment, substrate web 702 may have electrode layer 704 applied directly to the substrate web and a separator layer 706 disposed on top of the electrode layer. The electrode layer may comprise one active material layer or two or more active material layers. In this embodiment, electrode body 710 may have a shape 708, which is defined by an edge 712 of the separator layer 706.

FIG. 8 further depicts how a "skip coating" method of manufacture may be implemented. In this embodiment, an electrode layer 804 may be applied to a substrate web 802 so that electrode layer 804 has a first shape 808. A separator layer 806 may be applied on a top surface of electrode layer 804 so that separator layer 806 has a second shape 810. First shape 808 of electrode layer 804 may have a first width and a first length. Second shape 810 of separator layer 806 may have a second width greater than the first width and a second length greater than the first length. During manufacture, this may be implemented by terminating coating of the separator layer later and initiating coating of the separator layer earlier than the coating of the active electrode layer. This ensures the outside edges of the active material layers are fully covered by the separator layer prior to electrode blanking.

Step 404 of method 400 includes coating a first layer of a composite electrode on a first side of the substrate. In some examples, the first layer may include a plurality of first particles adhered together by a first binder, the first particles having a first average particle size (or other first particle distribution). In some examples, the plurality of first particles may comprise a plurality of first active material particles. In some examples, the composite electrode is an anode suitable for inclusion within an electrochemical cell.

In this case, the first particles may comprise graphite (artificial or natural), hard carbon, titanate, titania, transition metals in general, elements in group 14 (e.g., carbon, silicon, tin, germanium, etc.), oxides, sulfides, transition metals, halides, and chalcogenides. In some examples, the composite electrode is a cathode suitable for inclusion within an electrochemical cell. In this case, the first particles may comprise transition metals (for example, nickel, cobalt, manganese, copper, zinc, vanadium, chromium, iron), and their oxides, phosphates, phosphites, and silicates. The cathode active material particles may also include alkalines and alkaline earth metals, aluminum, aluminum oxides and aluminum phosphates, as well as halides and chalcogenides.

The coating process of step 404 may include any suitable coating method(s), such as slot die, blade coating, spray-based coating, electrostatic jet coating, or the like. In some examples, the first layer is coated as a wet slurry of solvent, e.g., water or NMP (N-Methyl-2-pyrrolidone), binder, conductive additive, and active material. In some examples, the first layer is coated dry, as an active material with a binder and/or a conductive additive. Step 404 may optionally include drying the first layer of the composite electrode.

Step 406 of method 400 includes coating a second layer onto the first layer, forming a multilayered (e.g., stratified) structure. The second layer may include a plurality of second particles adhered together by a second binder, the second particles having a second average particle size (or other second particle distribution). In this example, the second layer comprises particles configured to function as a separator for the electrode. For example, the second layer may comprise ceramic particles, such as aluminum oxide (i.e., alumina ($\alpha$-$Al_2O_3$)), corundum, calcined, tabular, synthetic boehmite, silicon oxides or silica, zirconia, and/or the like.

In some examples, steps 404 and 406 may be performed substantially simultaneously. For example, both of the slurries may be extruded through their respective orifices simultaneously. This forms a two-layer slurry bead and coating on the moving substrate. In some examples, difference in viscosities, difference in surface tensions, difference in densities, difference in solids contents, and/or different solvents used between the first active material slurry and the second separator slurry may be tailored to cause interpenetrating finger structures at the boundary between the two composite layers. In some embodiments, the viscosities, surface tensions, densities, solids contents, and/or solvents may be substantially similar. Creation of interpenetrating structures, if desired, may be facilitated by turbulent flow at the wet interface between the first active material slurry and the second separator slurry, creating partial intermixing of the two slurries.

To facilitate proper curing in the drying process, the first layer (closest to the current collector) may be configured (in some examples) to be dried from solvent prior to the second layer (further from the current collector) so as to avoid creating skin-over effects and blisters in the resulting dried coatings.

In some examples, any of the described steps may be repeated to form three or more layers. For example, an additional layer or layers may include active materials to form a multilayered electrode structure before adding the separator layer. Any method described herein to impart structure between the first active material layer and the separator coating may be utilized to form similar structures between any additional layers deposited during the manufacturing process.

Method 400 may further include drying the composite electrode in step 408, and/or calendering the composite electrode. Both the first and second layers may experience the drying process and the calendering process as a combined structure. In some examples, step 408 may be combined with calendering (e.g., in a hot roll process). In some examples, drying step 408 includes a form of heating and energy transport to and from the electrode (e.g., convection, conduction, radiation) to expedite the drying process. In some examples, calendering is replaced with another compression, pressing, or compaction process. In some examples, calendering the electrode may be performed by pressing the combined first and second layers against the substrate, such that electrode density is increased in a non-uniform manner, with the first layer having a first porosity and the second layer having a lower second porosity.

Figure 9:
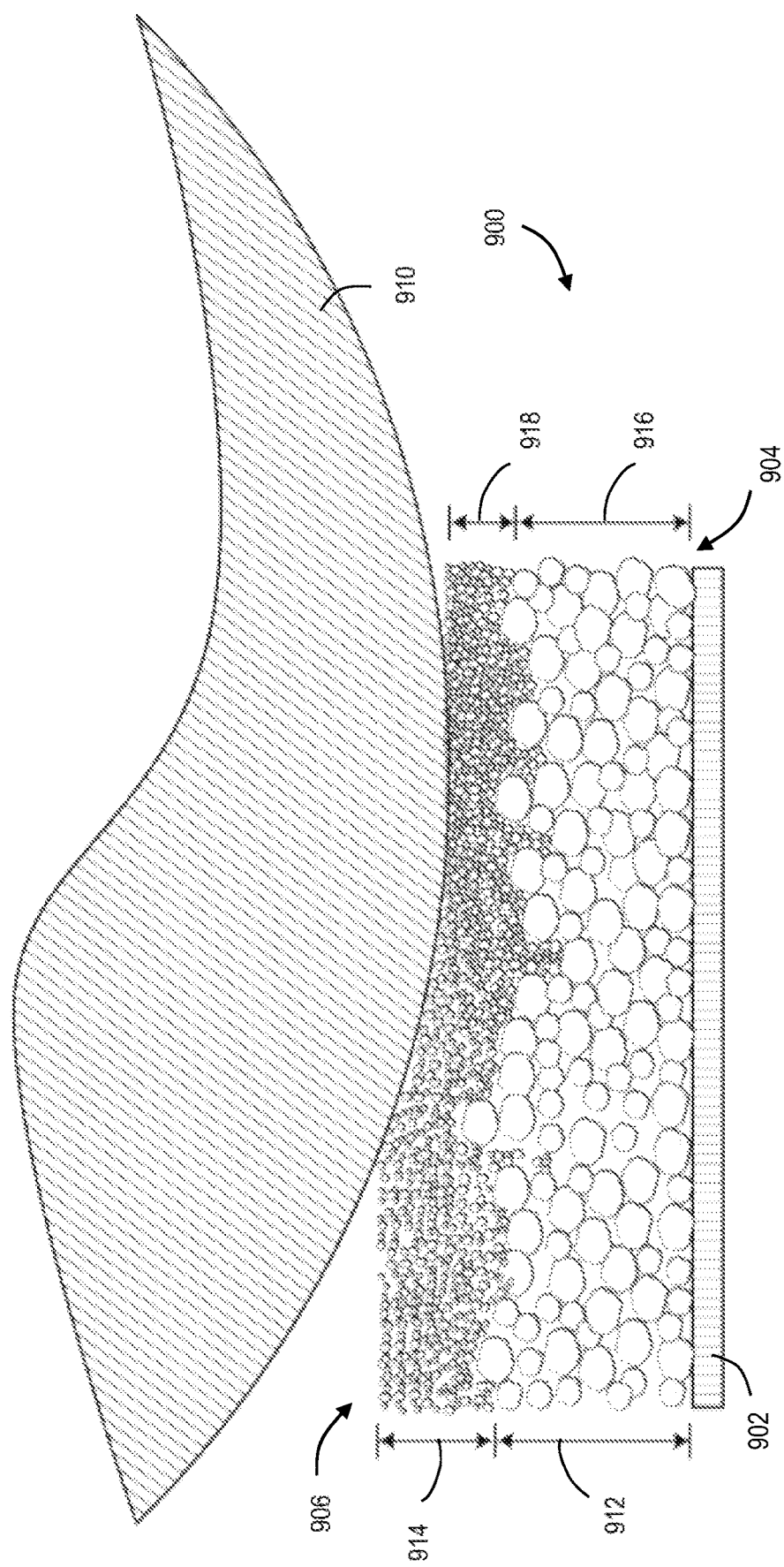
FIG. 9 is a sectional view of an illustrative electrode undergoing a calendering process in accordance with aspects of the present disclosure.

FIG. 9 shows an electrode undergoing the calendering process, in which particles in a second layer 906 (AKA the separator layer) can be calendered with a first layer 904 (AKA the active material layer). This may prevent a "crust" formation on the electrode, specifically on the active material layer. A roller 910 may apply pressure to a fully assembled electrode 900. Electrode 900 may include first layer 904 and second layer 906 applied to a substrate web 902. First layer 904 may have a first uncompressed thickness 912 and second layer 906 may have a second uncompressed thickness 914 prior to calendering. After the electrode has been calendered, first layer 904 may have a first compressed thickness 916 and second layer 906 may have a second compressed thickness 918. In some embodiments, second layer 906 may have a greater resistance to densification and a lower compressibility than first layer 904. After a certain level of densification, a higher tolerance to bulk compression of the separator layer may transfer a load to the more compressible electrode layer below. This process may effectively densify the anode without over densifying the separator layer.

E. Illustrative Manufacturing System

Figure 10:
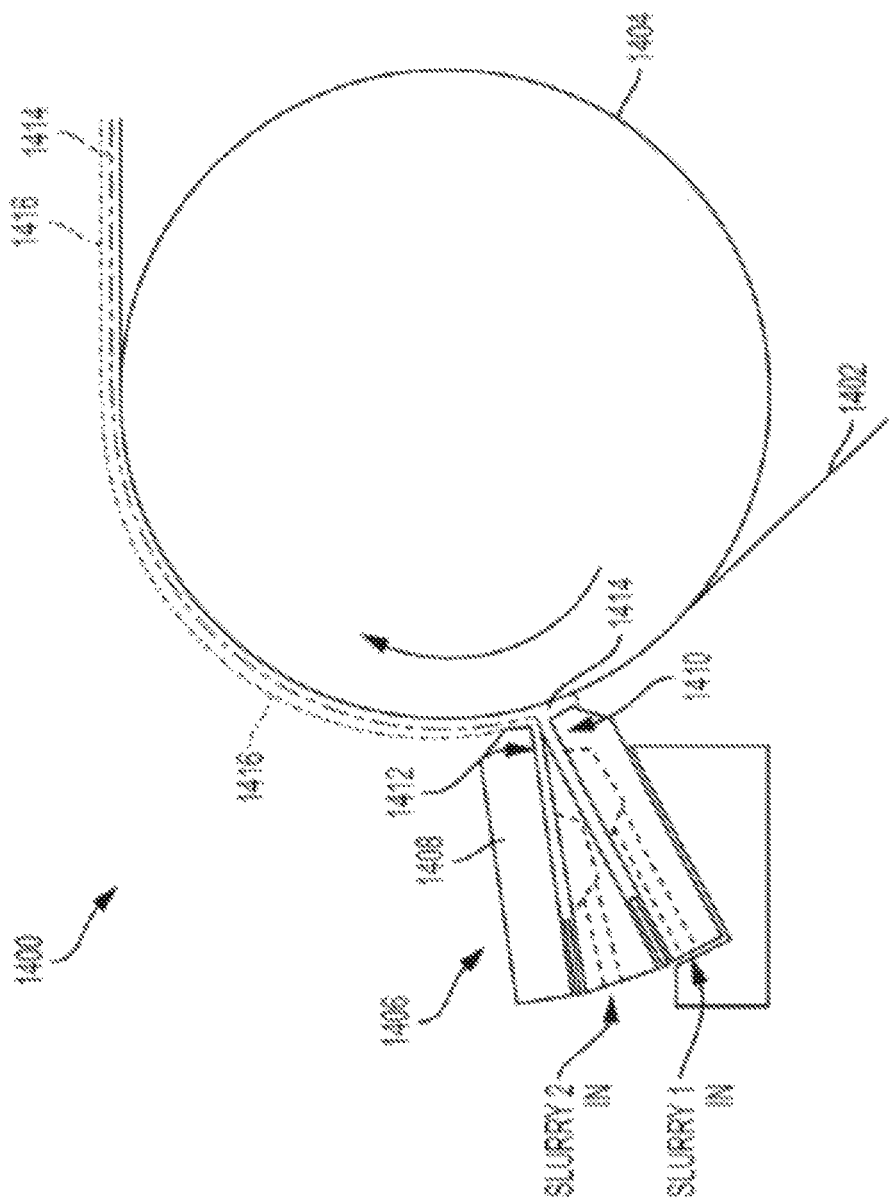
FIG. 10 is a schematic diagram of an illustrative manufacturing system suitable for manufacturing electrodes and electrochemical cells of the present disclosure.

Turning to FIG. 10, an illustrative manufacturing system 1400 for use with method 400 will now be described. In some examples, a slot-die coating head with at least two fluid slots, fluid cavities, fluid lines, and fluid pumps may be used to manufacture a battery electrode featuring an active material layer and an integrated separator layer (AKA a separator coating). In some examples, additional cavities may be used to create additional active material layers.

In system 1400, a foil substrate 1402 is transported by a revolving backing roll 1404 past a stationary dispenser device 1406. Dispenser device 1406 may include any suitable dispenser configured to evenly coat one or more layers of slurry onto the substrate. In some examples, the substrate may be held stationary while the dispenser head moves. In some examples, both may be in motion. Dispenser device 1406 may, for example, include a dual chamber slot die coating device having a coating head 1408 with two orifices 1410 and 1412. A slurry delivery system may supply two different slurries to the coating head under pressure. Due to the revolving nature of backing roll 1404, material exiting the lower orifice or slot 1410 will contact substrate 1402 before material exiting the upper orifice or slot 1412. Accordingly, a first layer 1414 will be applied to the substrate and a second layer 1416 will be applied on top of the first layer. In the present disclosure, the first layer 1414 may be the active material of an electrode and the second layer may be a separator layer.

Manufacturing method 400 may be performed using a dual-slot configuration, as described above, to simultaneously extrude the electrode material and the separator layers, or a multi-slot configuration with three or more dispensing orifices used to simultaneously extrude a multilayered electrode with an integrated separator layer. In some embodiments, manufacturing system 1400 may include a tri-slot configuration, such that a first active material layer, a second active material layer, and the separator layer may all be extruded simultaneously. In another embodiment, the separator layer may be applied after the electrode (single layered or multilayered) has first dried.

Additional aspects and features of manufacturing systems and methods for electrodes having integrated ceramic separators are presented below, without limitation, as a series of interrelated paragraphs.

E0. A method of manufacturing an electrode for an electrochemical cell, the method comprising:

causing a current collector substrate and an electrode material composite dispenser to move relative to each other; and coating at least a portion of the current collector substrate with an electrode material composite and a separator material to produce an electrochemical cell electrode, using the dispenser, wherein coating includes:

dispensing one or more active material layers each comprising a slurry of active material composite onto the current collector substrate using one or more respective first orifices of the dispenser; and dispensing a separator layer onto the one or more active material layers while the active material composite is wet, using one or more second orifices of the dispenser, such that the one or more active material layers are between the separator layer and the current collector substrate, the separator layer including a plurality of ceramic particles;

wherein an interpenetrating boundary is formed between the separator layer and an adjacent one of the one or more active material layers.

E1. The method of E0, wherein the electrode material composite dispenser comprises a slot-die coating head dispenser having a plurality of dispensing slots.

E2. The method of E0 or E1, wherein the interpenetrating boundary is formed by an interlocking region coupling the separator layer to the adjacent one of the one or more active material layers, the interlocking region including an interpenetration in which first fingers of the separator layer interlock with second fingers of the active material composite.

E3. The method of any one of paragraphs E0 through E2, wherein the one or more active material layers include a first layer having a plurality of first active material particles, and a second layer having a plurality of second active material particles.

E4. The method of any one of paragraphs E0 through E3, further comprising calendering the electrode after the one or more active material layers and the separator layer have dried.

F0. A method of manufacturing an electrode for an electrochemical cell, the method comprising:

causing a current collector substrate and an electrode material composite dispenser to move relative to each other; and coating at least a portion of the current collector substrate with an electrode material composite to produce an electrochemical cell electrode, using the dispenser, wherein coating includes:

applying a first layer to the current collector substrate using a first orifice of the dispenser, the first active material layer including a first active material composite slurry having a plurality of first active material particles and a first binder;

applying a second layer to the first active material layer while the first active material layer is wet, using a second orifice of the dispenser, the second layer including a separator material slurry having a plurality of ceramic particles and a second binder; and forming an interlocking region adhering the first layer to the second layer, the interlocking region including an interpenetration of the first layer and the second layer in which first fingers of the first layer interlock with second fingers of the second layer.

G0. A method of manufacturing an electrode for an electrochemical cell, the method comprising:

applying a first layer of a first active material composite slurry to a foil substrate using a first fluid slot of a slot-die coating head dispenser, wherein the first active material composite slurry comprises a plurality of first active material particles and a first binder; and applying a second layer of a separator material slurry to the first layer while the first layer is wet, using a second slot of the slot-die coating head dispenser, wherein the separator material slurry comprises a plurality of inorganic particles and a second binder;

wherein an interpenetrating boundary layer is formed between the first layer and the second layer.

H0. A method of manufacturing an electrode for an electrochemical cell, the method comprising:

causing relative motion between a separator material dispenser and a current collector substrate on which is disposed a first layer of active material composite, wherein the first layer includes a plurality of first active material particles and a first binder; and applying a second layer of separator material onto the first layer, using an orifice of the dispenser, the second layer including a separator material slurry having a plurality of ceramic particles and a second binder;

wherein applying the second layer of separator material slurry forms an interlocking region adhering the first layer to the second layer, the interlocking region including an interpenetration of the first and second layers in which first fingers of the first layer interlock with second fingers of the second layer.

I0. A method of manufacturing an electrode for an electrochemical cell, the method comprising:

causing a current collector substrate and an electrode material composite dispenser to move relative to each other, wherein the current collector substrate is at least partially coated by an uncalendered layer of active material composite; and coating at least a portion of the uncalendered layer with a separator material, using an orifice of the dispenser, forming a separator layer including a plurality of inorganic (e.g., ceramic) particles; and forming an interlocking region adhering the separator layer to the layer of active material composite, the interlocking region including an interpenetrating boundary layer between the inorganic particles and the active material composite.

J0. A method of manufacturing an electrode for an electrochemical cell, the method comprising:

applying a first layer of a first active material composite slurry to a foil substrate, wherein the first active material composite slurry comprises a plurality of first active material particles and a first binder; and applying a second layer of a separator material slurry to the first layer before calendering, using a slot of a slot-die coating head dispenser, wherein the separator material slurry comprises a plurality of ceramic particles and a second binder;

wherein an interpenetrating boundary layer is formed between the first layer and the second layer.

F. Illustrative Electrochemical Bilayer Cells with Integrated Separator

Figure 11:
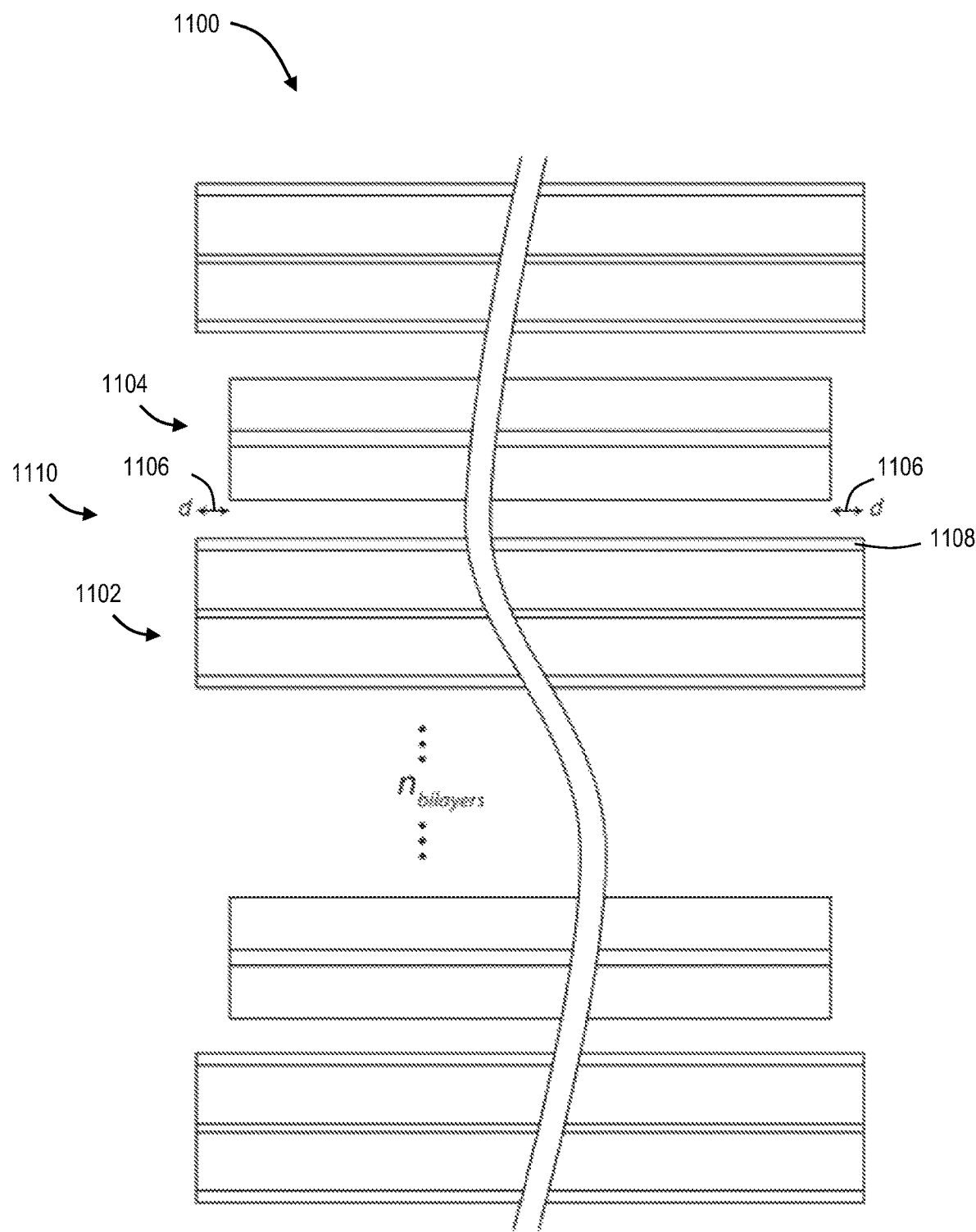
FIG. 11 is a schematic diagram of an illustrative stacked cell format in accordance with aspects of the present disclosure.
Figure 12:
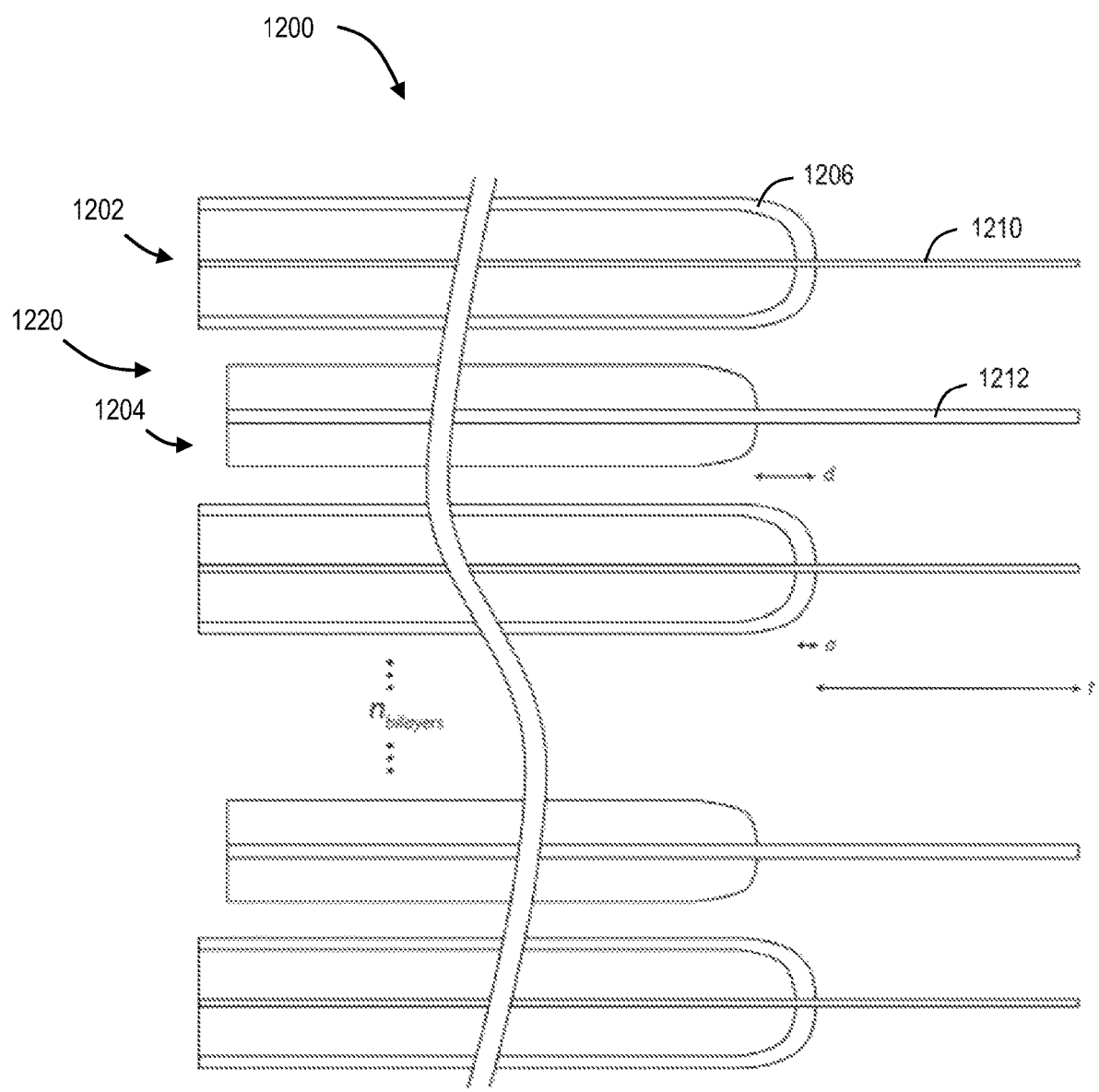
FIG. 12 is a schematic diagram of an illustrative stacked cell format with protruding tabs, in accordance with aspects of the present disclosure.
Figure 13:
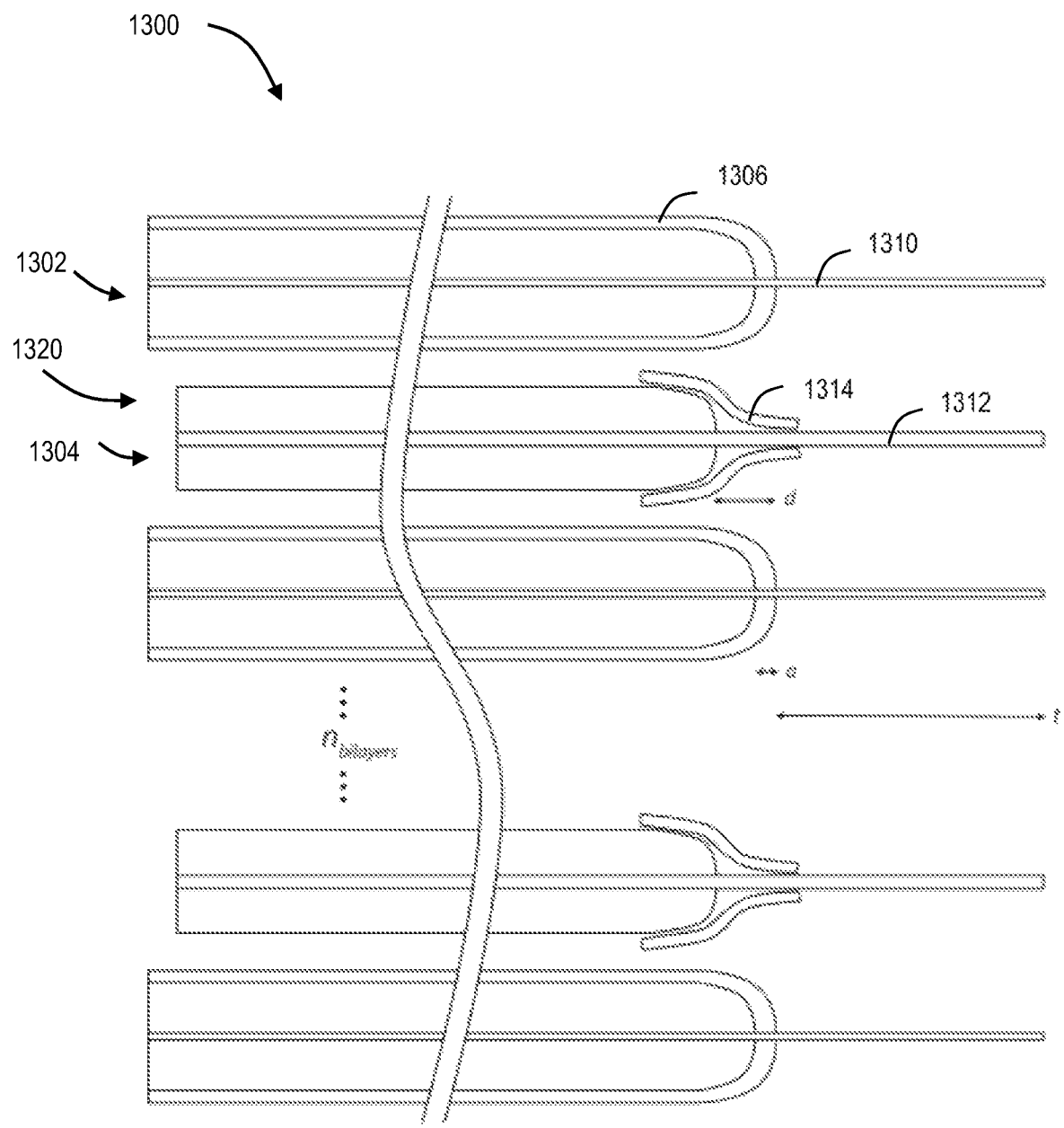
FIG. 13 is a schematic diagram of an illustrative stacked cell format with tape applied to cathode layers, in accordance with aspects of the present disclosure.

FIGS. 11, 12, and 13 depict examples of electrochemical bilayer cells including electrodes with integrated separators. Aspects of electrodes and manufacturing devices described herein may be utilized as components of the electrochemical bilayer cells described below.

FIG. 11 depicts an example of a stacked cell configuration 1100. A bilayer cell 1110 may be formed by two electrodes (e.g., an anode 1102 and a cathode 1104). One or both of anode 1102 and cathode 1104 may be multi-layered, similar to electrode 300 of FIG. 4. Depending on the application, a plurality of bilayer cells may be configured to form the stacked cells. In some embodiments, a first and last electrode in a cell including n electrodes may be anodes 1102. In a stacked cell format 1100, anode 1102 may be configured to be longer than cathode 1104 by a distance 1106. Distance 1106 may be such that the distal ends of anode 1102 extend further than the distal ends of cathode 1104. The increased length of the anode may help prevent shorting between the two electrodes. In the present example, anode 1102 may include an integrated separator layer 1108. A similar configuration may be used for wound cells. In the case of wound cells, a single bilayer cell is formed using any of the methods described herein, after which the bilayer cell is wound or rolled.

FIG. 12 shows a stacked cell configuration 1200 having tabs 1210 and 1212 protruding from an anode 1202 and a cathode 1204 respectively, in a bilayer cell 1220. One or both of anode 1202 and cathode 1204 may be multi-layered, similar to electrode 300 of FIG. 4. Tab 1210, in the present example, may protrude from anode 1202, passing through electrode layer 1205 and separator layer 1206. A thicker separator layer 1206 on the distal end of the electrode where the tab protrudes may prevent shorting between anode 1202 and cathode 1204.

FIG. 13 shows a stacked cell configuration 1300 having tabs 1310 and 1312 protruding from an anode 1302 and a cathode 1304 respectively, in a bilayer cell 1320. One or both of anode 1302 and cathode 1304 may be multi-layered, similar to electrode 300 of FIG. 4. Tab 1310, in the present example, may protrude from anode 1302, passing through electrode layer 1305 and separator layer 1306. A thicker separator layer 1306 on the distal end of the electrode where the tab protrudes may prevent shorting between anode 1302 and cathode 1304. Tape 1314 may be applied to cathode 1304 and tab 1312 at the distal end of the electrode, further adding insulation and preventing shorting between anode 1302 and cathode 1304.

Advantages, Features, and Benefits

The different embodiments and examples of the electrode including an integrated ceramic separator described herein provide several advantages over known solutions for manufacturing an electrochemical cell including a separator. For example, illustrative embodiments and examples described herein allow for the separator and the other composite layers of the electrode to be manufactured simultaneously. Where known methods of manufacturing require the separator to be manufactured independently from the electrode, the methods and systems described in the present disclosure simplify the manufacturing process by facilitating simultaneous manufacturing.

Additionally, and among other benefits, illustrative embodiments and examples described herein allow for a more robust interface between the separator layer and the active material layer on which the separator is disposed. The non-planar interface between the two layers may be manufactured such that there is a plurality of fingers interlocking the layers together. This may provide the electrode with more stability and may reduce interfacial resistance while increasing ion mobility through the electrode. Additionally, this provides the separator layer increased resistance to shrinking upon reaching elevated temperatures, such as in a thermal runaway event.

No known system or device can provide the benefits of the integrated separator layer as described herein. The simplification of the manufacturing process, as well as the functional advantages described above, provide a substantial improvement to known methods for manufacturing electrodes. Thus, the illustrative embodiments and examples described herein are particularly useful for manufacturing electrodes for use in electrochemical cells. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An electrochemical cell electrode having an integrated separator layer, the electrode comprising:

an electrochemical cell electrode including a current collector substrate and an electrode material composite including a plurality of first active material particles layered onto the current collector substrate, the first active material particles having a first average particle size;

a separator layer including a plurality of inorganic particles, disposed such that the electrode material composite is between the separator layer and the current collector substrate, the inorganic particles having a second average particle size; and an interlocking region adhering the separator layer to the electrode material composite, the interlocking region including a non-planar interpenetration of the separator layer and the electrode material composite in which first irregular fingers of the electrode material composite interlock and are three-dimensionally interdigitated with second irregular fingers of the separator layer;

wherein a length of the first fingers is greater than twice the first average particle size or twice the second average particle size, whichever is smaller; and wherein a total thickness of the interlocking region is greater than the length of the first fingers.

2. The electrode of claim 1, wherein the electrode material composite comprises a first layer including the plurality of first active material particles, and a second layer including a plurality of second active material particles.

3. The electrode of claim 1, wherein a mass percent of the inorganic particles in the separator layer is greater than 50%.

4. The electrode of claim 3, wherein the mass percent of the inorganic particles in the separator layer is greater than 99%.

5. The electrode of claim 1, wherein the separator layer further comprises a polymer mixed with the inorganic particles, such that a mass fraction of the inorganic particles in the separator layer is less than 50% and a mass fraction of the polymer is greater than 50%.

6. The electrode of claim 1, further comprising a layer of polyolefin disposed on the separator layer, such that the separator layer is between the layer of polyolefin and the electrode material composite.

7. The electrode of claim 1, wherein the plurality of inorganic particles comprise a ceramic material.

8. An electrochemical cell electrode having an integrated separator layer, the electrode comprising:
   an electrochemical cell electrode having a current collector substrate coupled to one or more active material layers each comprising a respective plurality of active material particles, the active material particles having a first average particle size; and
   a separator layer in direct contact with an adjacent layer of the one or more active material layers, such that the one or more active material layers are between the separator layer and the current collector substrate, the integrated separator layer including a plurality of ceramic particles, the ceramic particles having a second average particle size;

wherein an interlocking region secures the separator layer to the adjacent active material layer, the interlocking region including a non-planar boundary between the separator layer and the adjacent active material layer, such that the adjacent active material layer and the separator layer are interpenetrated;

wherein the non-planar boundary comprises a plurality of substantially discrete irregular first fingers of the active material particles interlocked and three-dimensionally interdigitated with a plurality of substantially discrete irregular second fingers of the ceramic particles;

wherein a length of the first fingers is greater than twice the first average particle size or twice the second average particle size, whichever is smaller; and wherein a total thickness of the interlocking region is greater than the length of the first fingers.

9. The electrode of claim 8, comprising only a single active material layer extending from the current collector substrate to the separator layer.

10. The electrode of claim 8, wherein a mass percent of the ceramic particles in the separator layer is greater than 50%.

11. The electrode of claim 10, wherein the mass percent of the ceramic particles in the separator layer is greater than 99%.

12. The electrode of claim 8, wherein the separator layer further comprises a polymer mixed with the ceramic particles, such that a mass fraction of the ceramic particles in the separator layer is less than 50% and a mass fraction of the polymer is greater than 50%.

13. The electrode of claim 8, further comprising a layer of polyolefin disposed on the separator layer, such that the separator layer is between the layer of polyolefin and the one or more active material layers.

14. The electrode of claim 8, wherein the plurality of ceramic particles consist of an aluminum oxide.

* * * * *